United States Patent [19]

Lüers et al.

[11] Patent Number: 4,675,122

[45] Date of Patent: Jun. 23, 1987

[54] COMBINED ANTIBLOCKING AND LUBRICANT CONCENTRATE

[75] Inventors: Georg Lüers, Westhofen; Richard Sobottka, Worms, both of Fed. Rep. of Germany

[73] Assignee: Grace G.m.b.H., Worms, Fed. Rep. of Germany

[21] Appl. No.: 659,637

[22] Filed: Oct. 11, 1984

[30] Foreign Application Priority Data

Oct. 14, 1983 [DE] Fed. Rep. of Germany ....... 3337356

[51] Int. Cl.⁴ .............................................. C08K 5/16
[52] U.S. Cl. ................. 252/28; 252/51.5 R; 252/51.5 A; 524/232; 524/231
[58] Field of Search ............... 252/28, 51.5 R, 51.5 A; 524/232, 231

[56] References Cited

U.S. PATENT DOCUMENTS

| | | | |
|---|---|---|---|
| 2,770,608 | 11/1956 | Barker et al. | 524/232 |
| 2,980,611 | 4/1961 | Martinek et al. | 252/28 |
| 2,991,265 | 7/1961 | Clark et al. | 524/232 |
| 3,330,796 | 7/1967 | Mock et al. | 524/232 |
| 3,562,291 | 2/1971 | Lutzmann et al. | 524/232 |
| 4,529,764 | 7/1985 | McKinney et al. | 524/232 |

FOREIGN PATENT DOCUMENTS

1210177 2/1966 Fed. Rep. of Germany .
WO85/00613 2/1985 PCT Int'l Appl. .

*Primary Examiner*—William R. Dixon, Jr.
*Assistant Examiner*—Cynthia A. Prezlock
*Attorney, Agent, or Firm*—Edward J. Cabic

[57] ABSTRACT

Combined antiblocking agent and lubricant concentrate based on polyolefin, which contains diatomaceous earth, precipitated silica and/or silica gel as the antiblocking agent, one or more amides of unsaturated $C_{18}$–$C_{22}$-fatty acids and optionally further conventional additives and which is characterized in that it contains 5 to 35% by weight of antiblocking agent and 5 to 30% by weight of lubricant. The high lubricant concentration in the combination concentrate according to the invention is obtained in that the antiblocking agent and the lubricant are incorporated into the polyolefin in the form of a homogeneous, finely divided mixture. The antiblocking agent serves as a carrier for the micronized lubricant, i.e. the lubricant is adsorbed on the large surface of the antiblocking agent, so that the "flowing away" of the lubricant otherwise observed in the case of high lubricant concentrations during incorporation into the polyolefin is avoided. The concentrate according to the invention is more particularly suitable for use in the production of polyolefin films. Apart from action improvements, the advantages of the concentrate according to the invention are more particularly apparent in the economic field because compared with the prior art, only a single concentrate is required which, due to the high lubricant concentration, need only be used in much smaller quantities.

16 Claims, 2 Drawing Figures

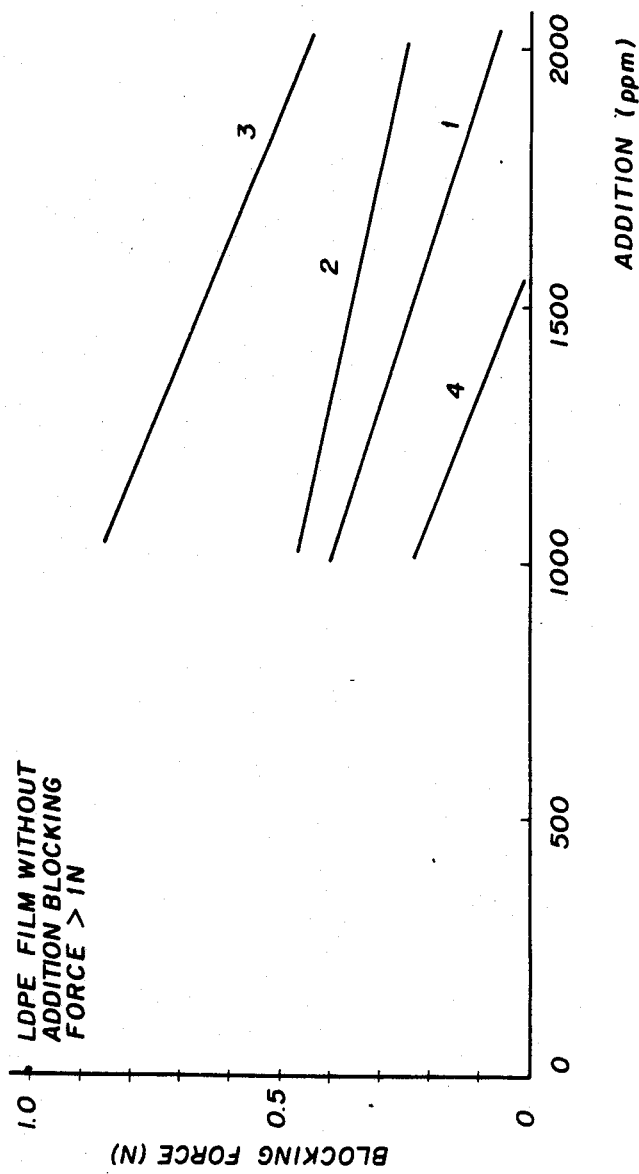

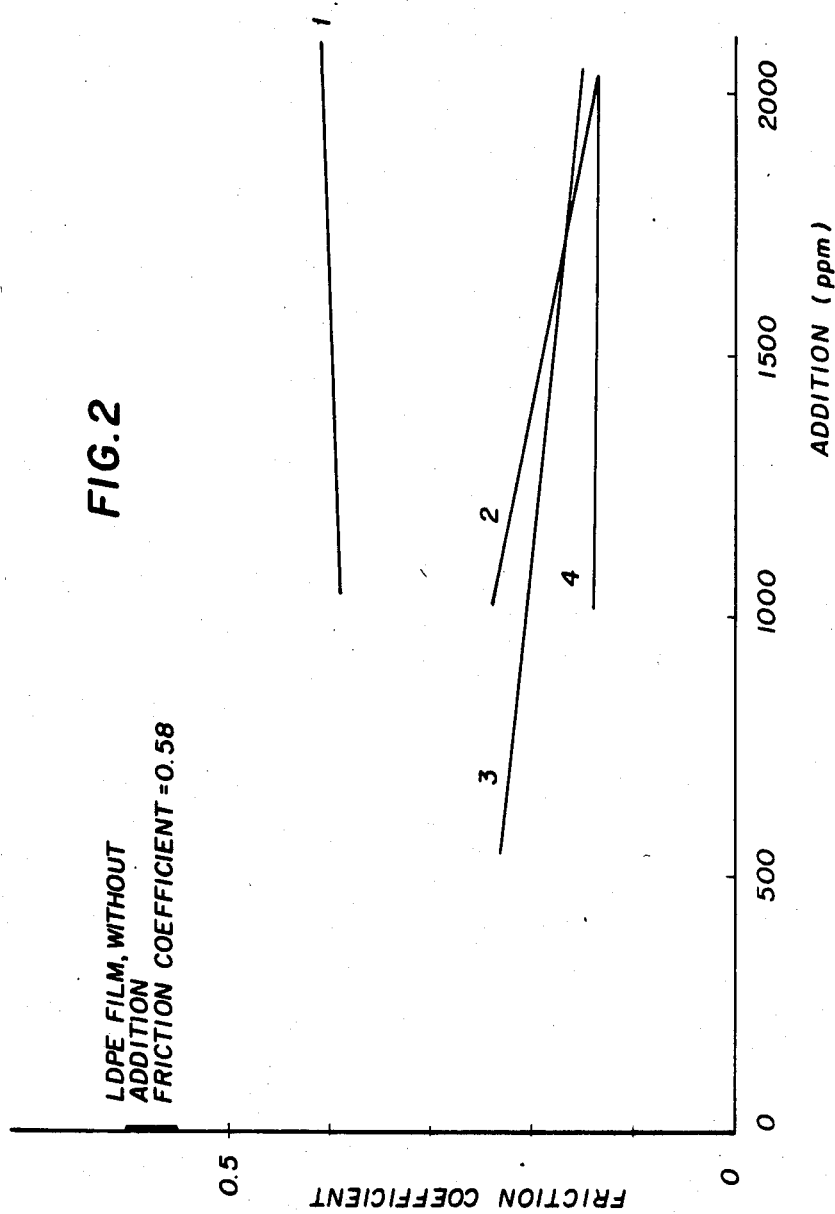

COMBINED ANTIBLOCKING AND LUBRICANT CONCENTRATE

The invention relates to a combined antiblocking and lubricant concentrate based on polyolefin which contains diatomaceous earth, silica and/or silica gel as the antiblocking agent, one or more amides of unsaturated $C_{18}$–$C_{22}$-fatty acids and optionally other conventional additives. This combined antiblocking and lubricant concentrate is suitable as an additive in the processing of polyolefins, such as in the production of polyolefin films.

In the production of polyolefin films, it is known to add additives, which have a positive influence on the antiblocking and sliding properties of the finished film. The antiblocking and lubricating agent is added in such a way that, prior to extrusion, an antiblocking agent concentrate and a lubricant concentrate, i.e. two separate concentrates, are added to the polyolefin. The antiblocking agent used is e.g. finely divided diatomaceous earth, silica, silica gel, chalk and talc. The main lubricant used is constituted by amides of unsaturated $C_{18}$–$C_{22}$-fatty acids and particularly oleic acid amide and erucic acid amide. For economic reasons, it is desirable for the concentrates used to be filled to the maximum possible extent with the additives, the antiblocking or lubricating agent. Thus, the antiblocking agent concentrate is provided with the maximum antiblocking agent concentration which is technically possible and, as a function of the apparatus used, this is between 25 and 50% by weight. The same applies in connection with the lubricant concentrate, but then only a concentration of 3% by weight and under optimum conditions max. 5% by weight can be achieved, because higher lubricant quantities merely flow away on incorporation into the polyolefin. Therefore, it is often not possible to achieve 5% by weight of lubricant. There is also too great a "sliding" of the lubricant during incorporation, so that the shear forces required for incorporation are lost. Thus, the commercially available lubricant concentrates usually only contain approximately 2% by weight of lubricant.

The disadvantage of using separate antiblocking agent concentrates and lubricant concentrates is obvious, because it is initially necessary to prepare two concentrates and then add two concentrates to the polyolefin to be processed. It would therefore be more advantageous to have only a single concentrate, containing both the antiblocking agent and the lubricant. This procedure is, for example, described in U.S. Pat. No. 2,956,035 where, in the preparation of polyethylene films, a mixture is added to the basic polyethylene resin which, inter alia, contains a lubricant and an antiblocking agent incorporated into a partially decomposed polyethylene. As can be gathered from the examples (cf particularly Example 1), the antiblocking agent concentration in the concentrate is only 10% by weight, whilst that of the lubricant is only 1.5% by weight. This means that the maximum economically desired antiblocking agent concentration in the concentrate is far from reached, whilst the concentration of the lubricant falls within the standard concentration range, known from the aforementioned pure lubricant concentrates.

During the production of polyolefin films, it is necessary to have approximately the same quantities of antiblocking agent and lubricant. This means that, in practice, due to the different contents, it is necessary to use varying quantities of antiblocking agent concentrate and lubricant concentrate. However, when proceeding in accordance with DE-AS No. 1,210,177 and using only a single concentrate, which contains both antiblocking agent and lubricant, the difficulty arises that, due to the limited lubricant content, the antiblocking agent concentration in the concentrate is well below the maximum permitted concentration, which is extremely uneconomic, because much too large concentrate quantities have to be produced and incorporated into the polyolefin.

On the basis of this situation and particularly for economic reasons, there is a need for a combined antiblocking and lubricant concentrate, which has a maximum content of both antiblocking agent and lubricant, so that the economically sought, maximum antiblocking agent concentration is reached to the greatest possible extent. Such a concentrate could not hitherto be produced, due to the limited lubricant quantities, which could be incorporated into the concentrate.

Thus, the problem of the present invention is to provide a combined antiblocking and lubricant concentrate, in which the maximum antiblocking agent incorporation concentration is reached and in which the lubricant is present in such a concentration that the antiblocking agent and lubricant contents of the concentrate are approximately the same, in accordance with practical requirements. Thus, the problem of the invention is to provide a combined antiblocking agent and lubricant concentrate, which has a higher lubricant concentration that hitherto known, in the presence of approximately the same amounts of antiblocking agent.

According to the invention, this problem is solved by a combined antiblocking agent and lubricant concentrate of the type characterized in the claims. The invention also relates to a process for producing the concentrate according to the invention and the use thereof in the production of polyolefin films.

The invention is based on the surprising finding, that in the production of a concentrate based on polyolefin, lubricant quantities exceeding 5% by weight can be incorporated, if the lubricant, generally present in the form of floats or coarse-grained powder is micronized and incorporated together with specific antiblocking agents. It is of decisive importance that the two aforementioned features are realised, because the micronization of the lubricant alone does not make it possible to achieve higher concentrations than hitherto for a lubricant concentrate, i.e. even when using micronized lubricant, it is only possible to incorporate approximately 3% by weight of lubricant into the polyolefin concentrate. It is assumed that the lubricant which has become microfine as a result of the micronization becomes attached to the surface (including the surface of the pores) of the antiblocking agent particles, due to the high adsorption capacity of the simultaneously present antiblocking agent. In other words, the antiblocking agent particles act as a carrier and during incorporation prevent the "flowing away" of the relatively high lubricant quantity due to the adsorptiveness of the antiblocking agent. A further effect of the antiblocking agent particles is the maintaining of the necessary melting viscosity during incorporation. Thus, the lubricant alone reduces the melting viscosity, so that the necessary shear forces are lost. The antiblocking agent particles alone lead to the opposite effect, namely a rise in the melting viscosity, i.e. increased shear forces are required for optimum dispersion. Thus, in the incorporation of both additives as a combination in accordance with the present invention, the incorporation characteristics of the individual additives are neutralized, i.e. the incorporation of the mixture of the antiblocking agent and lubricant can take place under an optimum melting viscosity.

The combined antiblocking agent and lubricant concentrate according to the invention is produced by initially preparing a homogeneous, finely divided mixture of antiblocking agent and lubricant. For this purpose, the coarse-grained components of the mixture are combined and are mixed under conditions such that the coarse-grained particles are comminuted to fine particles. For this purpose, it is possible to use known means, such as jet mills, impact mills, as well as other mixers and mills. The antiblocking agent is preferably used in the form of a commercial product, which is already in the necessary finely divided form. However, the fatty acid amides used as lubricants are generally in the form of flakes or coarse-grained powders. Thus, in the presently described procedure, there is only a comminution of the lubricant. In order to facilitate comminution, it is preferable to carry out mixing whilst simultaneously adding liquid nitrogen. The nitrogen is used to embrittle the fatty acid amides. However, the mixture of the antiblocking agent and the lubricant can also be produced at temperatures above the melting point of the lubricant (e.g. by jet milling). In this case, during the actual preparation of the mixture, the lubricant is distributed as a particle-free mass onto the antiblocking agent particles. Alternatively, in the preliminary stage, it is possible to comminute the lubricant alone and then mix it with the antiblocking agent which is already in fine-particulate form, this taking place under conventional, but less strict conditions.

As can be also gathered from what has been stated hereinbefore, to fulfil its carrier function, the antiblocking agent must have an adequately large surface, i.e. it must have an adequate pore volume, so that as a result of the internal structure, the necessary surface is provided. The antiblocking agent must also have an adequately small particle size, because this is responsible for the antiblocking action. Thus, in the mixture of antiblocking agent and lubricant and also in the subsequently produced concentrate, the antiblocking agent appropriately has an average particle size of up to 10 $\mu$m. However, preference is given to average particle sizes for the antiblocking agent between 1 and 7 $\mu$m and more specifically between 2 and 5 $\mu$m. In the mixture of the antiblocking agent and the lubricant, the latter should have an average particle size of 1 to 100 $\mu$m, or should be present in the form of a particle-free, homogeneously distributed mass in the case of the aforementioned alternative of preparing the mixture at a temperature above the melting point of the lubricant. Good results are, for example, obtained with oleic acid amide having an average particle size of 38 $\mu$m. The known Coulter counter process is used for determining the particle size.

The thus obtained finely divided mixture of antiblocking agent and lubricant is then processed to a concentrate in per se known manner, in that it is brought into a polyolefin (usually melted polyolefin) and is homogeneously distributed therein. Generally, the polyolefin is provided beforehand and the mixture of the antiblocking agent and the lubricant is added thereto. The Expert is aware of the means suitable for this purpose, such as internal mixers and screw kneaders (cf e.g. U.S. Pat. Nos. 2,956,035 and 3,786,018 ). The polyolefin (e.g. polyethylene, polypropylene, etc) used as a concentrate base is preferably the same polyolefin as that to which the concentrate ferably the same is subsequently added. Following an adequately long incorporation of the mixture of the lubricant and the antiblocking agent into the polyolefin, the combined antiblocking agent and lubricant concentrate is obtained in a conventional manner, i.e. it is processed to a powder, granules, etc.

Although the antiblocking agent contained in the antiblocking agent/lubricant concentrate according to the invention is known per se, its selection is of great importance to the invention. Thus, it is only possible to use as the antiblocking agent, substances which reveal the aforementioned action during simultaneous incorporation with the lubricant into the basic polyolefin. These include diatomaceous earth, precipitated silica and silica gel. As stated hereinbefore, suitable, commercially available products have an average particle size of up to 10 $\mu$m. Apart from diatomaceous earth, the BET-surface of these products is generally $400 \pm 200$ m$^2$. As examples, mention is made of the products marketed by the W. R. Grace & Company under the name SYLOID with the type designation 72, 77, 85, 244 and 276 (cf Grace brochure entitled "SYLOID", characteristics, uses, delivery programme, Mar. 1980, printed in the German Federal Republic, printing notation 1-2-00.4 Gi). That the selection of the antiblocking agent is of critical importance is shown by the fact that chalk and talc are not suitable in the antiblocking agent/ lubricant combination according to the invention. As will be described in the examples, with the same high concentrations as in the concentrate according to the invention, the lubricant merely flowed out when incorporated into the basic polyolefin. Even a 10% concentration, well below the optimum concentration obtainable according to the invention, could not be obtained.

In the invention, the conventional amides of unsaturated fatty acids with 18 to 22 carbon atoms are used as the lubricant. The commercially available products are mainly oleic acid amide and erucic acid amide. It is obviously also possible to use mixtures of these amides. In connection with commercially available products and their known use as antiblocking agents, reference is made e.g. to Herman Römpp "Chemie Lexikon", 6th edition 1966, p. 434, heading "Armids" where the "Aramids" are stated to be used as antiblocking agents for the production of synthetic resin plastics. As can be gathered from this literature reference, these fatty acid amides are flake-like, i.e. coarse-grained products.

The antiblocking agent/lubricant concentrate according to the invention is incorporated into the polyolefin in known manner during the processing of polyolefins and particularly the production of polyolefin films. The effectiveness of the concentrate according to the invention is at least equally as good as the conventional addition of two separate concentrates and usually, depending on the polyolefin, is even better. The improved activity particularly occurs in connection with the sliding action, which is due to the fact that the lubricant hitherto used in the form of flakes or coarse-grained powders was not homogeneously distributed in the polymer during incorporation. The films finished with the lubricant concentrates locally have higher or lower lubricant contents, so that an optimum, uniform lubricant action can only be achieved after the films have been stored for a certain period and namely when a homogeneous state has been obtained through lubricant migration to the film surface. However, when using the concentrate according to the invention, the lubricant is homogeneously distributed from the outset, which is helped by the many antiblocking agent microparticles. Thus, from the outset, the films contain a lubricant particle at all points, i.e. the lubricant migration to the film surface takes place more homogeneously and with a more uniform speed.

Besides the action improvements as a result of the concentrate according to the invention, caused by the improved dispersion during the joint processing of the antiblocking agent and lubricant, particular importance is attached to the aforementioned economic advantages of the concentrate according to the invention. As a result of the invention, it is now possible to only have to produce a single concentrate, which also has a much higher lubricant concentration than the hitherto conventional separate lubricant concentrates. It is therefore only necessary to produce much less concentrate. Moreover, during polyolefin processing, only a single concentrate has to be added, which obviously represents an important simplification to the process. In addition, dosing problems during polyolefin processing are limited to a minimum, because the concentrate according to the invention already contains the antiblocking agent and lubricant in the ratio desired by the polyolefin manufacturer. As mentioned hereinbefore, when producing polyolefin films, this ratio is generally approximately 1:1. However, as a function of the intended use, the concentrate according to the invention can contain 5 to 35% by weight antiblocking agent, 5 to 30% by weight lubricant and, in the absence of other conventional additives, 35 to 90% by weight polyolefin. However, as for economic reasons, maximum antiblocking agent and lubricant concentrations are sought, preference is given to concentrates containing 15 to 30% by weight antiblocking agent, 15 to 30% by weight lubricant and correspondingly 40 to 70% by weight polyolefin (see above). Particular preference is given to a concentrate containing 25% by weight antiblocking agent, 25% by weight lubricant and therefore 50% by weight polyolefin (see above).

When processing polyolefins, the concentrate according to the invention is used in quantities such that conventional lubricant and antiblocking agent quantities are present. However, due to the aforementioned improved action, in many cases it is possible to use smaller quantities. When producing polyolefin films, the concentrate according to the invention is conventionally used in a quantity such that the polyolefin film produced contains 0.001 to 0.5% by weight lubricant and 0.001 to 0.5% by weight antiblocking agent and preferably 0.04 to 0.2% by weight of each of these two agents. Lubricant and antiblocking agent quantities which are frequently used are each in the range of about 500 to 2000 ppm.

Obviously, the antiblocking agent/lubricant concentrate according to the invention can also contain further additives, which are a function of the intended use of the concentrate.

The invention is further illustrated hereinafter by means of examples.

EXAMPLE 1

A very homogeneous mixture of a micronized amorphous silica gel (SYLOID 85, see above) and oleic acid amide (amide content approximately 90%, iodine number 80 to 95, free fatty acids max. 3.5%, melting point approximately 68° C.) is prepared in a double-cone mixer. The silica gel/oleic acid amide mixing ratio was 1. The thus prepared mixture was then comminuted in an impact mill (peripheral speed 90 m/sec), accompanied by the simultaneous addition of liquid nitrogen. A homogeneous powder mixture was obtained, in which the oleic acid amide was present in finely divided form (oleic acid amide particle size distribution between 10 and 100 $\mu$m, average particle size according to the Coulter counter process 38 $\mu$m; silica gel particle size distribution between 0.5 and 15 $\mu$m, average particle size 3.5 $\mu$m). The thus prepared mixture of antiblocking agent and lubricant was incorporated in a quantity of 30% by weight into low density high pressure polyethylene (LDPE), by means of an internal mixer. The temperature was 165° C. After incorporating for an adequately long time, the concentrate obtained was granulated in a conventional manner.

Then, two further concentrates were prepared in the same way for comparison purposes and consisted of 90% low density high presuure polyethylene (LDPE) and 10% of the above-used silica gel, or alternatively 95% of low density high pressure polyethylene (LDPE) and 5% of the above-described oleic acid amide.

The thus produced concentrates were used in the production of blown films of low density high pressure polyethylene (LDPE; Lupolen 2420H), the film thickness being 40 $\mu$m.

The blocking forces on the films produced using the aforementioned concentrates were measured by means of the Davenport blocking meter after blocking the films at 60° C., for 3 hours, under a load of 0.3 N/cm². A film without any addition was tested for control purposes and revealed blocking forces of 1N or higher. The value was 1N for the films investigated in the present case. The results obtained are shown graphically in FIG. 1, in which the blocking force is plotted against the additive quantity. Curve 1 shows the film behaviour on adding concentrate only containing antiblocking agent. Curve 2 shows the behaviour of the film when adding two separate concentrates, whereof one contains an antiblocking agent and the other a lubricant. Curve 3 gives the behaviour of the film, which only contains the aforementioned lubricant concentrate. Finally, curve 4 shows the behaviour of the film, produced using the concentrate according to the invention. In connection with curves 2 and 4, it is pointed out that e.g. at curve point 1000 ppm of additive, both the lubricant and the antiblocking agent are present in a quantity of 1000 ppm.

In addition, the sliding properties of the films produced by using the aforementioned concentrates were investigated, as a function of the quantity of additive added. Films without lubricant or antiblocking agent additions normally have friction coefficients between 0.5 and 0.8. The film investigated in the present case and to which no additive has been added had a friction coefficient of 0.58. The friction coefficients obtained as a function of the additive quantity used are graphically shown in FIG. 2, in which curves 1, 2, 3 and 4 again relate to the aforementioned films.

As is made clear by the aforementioned tests, the antiblocking agent/lubricant concentrate according to the invention has an at least equivalent action to the separate concentrates and is even superior thereto, particularly in the lower concentration range. Tests with corresponding concentrates, in which the oleic acid amide was replaced by erucic acid amide (amide content approximately 95%, iodine number 72 to 90, free fatty acids max 1%, melting point approximately 80° C.), gave essentially identical results.

EXAMPLE 2

Through mixing and grinding by means of an Alpine laboratory mill and accompanied by cooling with liquid nitrogen, combinations of oleic acid amide and diatomaceous earth (Superfloss, average particle size approximately 4 μm), chalk (average particle size 1 to 3 μm), talc (particle size <10 μm approx. 98% and <1 μm approx. 12%) and silica gel (SYLOBLOC 45) were prepared. In each case, the mixtures contained 50 or 40 parts by weight of oleic acid amide and 50 or 60 parts by weight of the second component. The mixtures obtained were yellowish fine powders.

The thus obtained mixtures were again incorporated in a quantity of 25% by weight into low density high pressure polyethylene (LDPE) at a temperature of 165° C. in an internal mixer. It was found that the combinations chalk/oleic acid amide and talc/oleic acid amide could not be dispersed or incorporated. After a short residence time in the initial mixer, the liquid combination "flowed" out of the mixer. Even when the concentration of the combinations was reduced to 10%, incorporation was not possible. However, it was possible to work without difficulty the combinations diatomaceous earth/oleic acid amide and silica gel/oleic acid amide. Without difficulty, the concentrations could be increased to 40% by weight and higher.

The low density high pressure polyethylene used for the blown film production was then finished as follows:
(a) 500, 1000, 2000 ppm of oleic acid amide,
(b) 500, 1000, 1500, 2000 ppm of silica gel or diatomaceous earth,
(c) 500, 1000, 1500, 2000 ppm of silica gel or diatomaceous earth, plus the same quantity of oleic acid amide, two separate concentrates being used,
(d) 1000, 2000, 3000, 4000 ppm of the above combinations in the ratio 1:1, i.e. in each case with 500 ppm of silica gel or diatomaceous earth and 500 ppm of oleic acid amide, 1000 ppm of silica gel or diatomaceous earth and 1000 ppm of oleic acid amide, etc,
(d) 1000, 2000, 3000, 4000 ppm of the above combinations in the ratio 3:2, i.e. in each case with 600ppm of silica gel or diatomaceous earth and 400 ppm of oleic acid amide, 1200 ppm of silica gel or diatomaceous earth and 800 ppm of oleic acid amide, etc.

It was found that all the concentrates used were well dispersed in the films. The investigation of the films obtained for their blocking and sliding properties in the manner described in Example 1, revealed that the concentrates according to the invention led to much better results than the concentrates only containing antiblocking agent or only lubricant. Compared with the use of two separate concentrates, one containing an antiblocking agent and the other a lubricant, the results described in Example 1 were confirmed, i.e. the concentrate according to the invention, particularly with regards to the sliding properties of the film in the lower concentration range (500 to 1500 ppm) led to definite advantages, whereas in the upper concentration range (1500 to 2000 ppm) there were virtually no differences in the action.

EXAMPLE 3

As described in Example 2, three further combinations of oleic acid amide were prepared with two molecular sieve powders and a precipitated silica. In each case, the mixtures contained 50 parts by weight of oleic acid amide and 50 parts by weight of the second component. The molecular sieve powders used were synthetic sodium aluminosilicate (Sipernat 44 of Degussa and SYLOSIV A10 of the Applicant). Sipernat 44 has an average particle size of 3 to 4 μm and a pore diameter of approximately 4 Å. SYLOSIV A10 has an average particle size of approximately 2 μm and a pore diameter of approximately 10 Å. The precipitated silica used was FK 310 of Degussa with an average particle size of 3 to 4 μm, a $SiO_2$ content of approximately 94% and a BET-surface of approximately 700 m$^2$/g.

The mixtures of oleic acid amide and molecular sieve powders could not be incorporated into the polyolefin. As in Example 2 in connection with the combinations chalk/oleic acid amide and talc/oleic acid amide, a white mass "flowed" out of the mixer. The third mixture of oleic acid amide and precipitated silica could be incorporated without difficulty into the polyolefin in a concentration of 30% by weight. The thus obtained concentrate gave similar results to the concentrates according to the invention described in Examples 1 and 2.

The described tests show that the lubricant requires a "carrier", to permit incorporation in the sought high concentrations and this carrier must have adsorption properties. Fatty acid amides alone have virtually no antiblocking agent. Conversely, the antiblocking agents used have no sliding action when used alone. Particularly in the lower concentration range, the combinations according to the invention were more effective than fatty acid amides alone and also more effective than two separate concentrates, whereof one contains a fatty acid amide and the other antiblocking agent. The combinations of fatty acid amides with diatomaceous earth, precipitated silica or silica gel in accordance with the invention do not significantly differ from one another in their properties. In addition, the tests show that the action of the concentrate according to the invention is scarcely influenced in the case of slight divergences (3:2) from the preferred antiblocking agent/lubricant mixing ratio of 1:1.

Thus, on incorporating the concentrate according to the invention in low density high pressure polyethylene (LDPE), the advantages of the concentrate according to the invention are mainly of an economic nature (low concentrate quantity, simplified production and use) and advantages of action are only of reduced significance. However, as further tests have shown, the action advantages are more important when the concentrate according to the invention is used in polypropylene films. The lubricant migration to the film surface then normally lasts a few days. However, the combination according to the invention gives the films good sliding properties immediately after extrusion.

What is claimed is:

1. A combined antiblocking and lubricant concentrate composition comprising
    (a) 5-35% by weight of an antiblocking agent selected from the group consisting of diatomaceous earth, precipitated silica, silica gel and mixtures thereof;
    (b) 5-30% by weight of a lubricant selected from the group consisting of amides of unsaturated $C_{18}$-$C_{22}$-fatty acids and mixtures thereof; and
    (c) polyolefin or a mixture of polyolefin and conventional polyolefin additives, said antiblocking agent is present in finely divided form with average particle size of up to 10 micrometers and said lubricant has a particle size of less than 100 micrometers and said antiblocking agent and said lubricant being homogeneously distributed in said polyolefin or a mixture of polyolefin and conventional polyolefin additives.

2. A concentrate composition according to claim 1, wherein the antiblocking agent is present from 15 to 30% by weight and the lubricant is present from 15 to 30% by weight.

3. A concentrate composition according to claim 2, wherein the antiblocking agent is present in about 25% by weight and the lubricant is present in about 25% by weight.

4. A concentrate composition according to claim 1, wherein said antiblocking agent has an average particle size from about 1 to 7 micrometers.

5. A concentrate composition according to claim 4, wherein said antiblocking agent has an average particle size from about 2 to 5 micrometers.

6. A process for preparing a concentrate composition comprising
(a) forming a homogeneous, finely divided mixture of antiblocking agent selected from the group consisting of diatomaceous earth, precipitated silica, silica gel and mixtures thereof, said antiblocking agent being present in finely divided form with a median particle size up to 10 micrometers, and lubricant selected from the group consisting of amides of unsaturated $C_{18}$–$C_{22}$-fatty acids and mixtures thereof and
(b) incorporating said mixture into a polyolefin or a mixture of polyolefin and conventional polyolefin additives whereby the amount of antiblocking agent is 5 to 35% by weight, the amount of lubricant is 5 to 30% by weight, and said lubricant has a particle size of less than 100 micrometers and is homogeneously distributed in the total concentrate.

7. A process according to claim 6, wherein the mixture incorporated in step (b) is incorporated into melted polyolefin.

8. A process according to claim 6, wherein the antiblocking agent, the lubricant or both are used in coarse-grained form and the mixing in step (a) is carried out under conditions such that the coarse particles are comminuted to fine particles.

9. A process according to claim 8, wherein the comminution is carried out while adding liquid nitrogen.

10. A process according to claim 8, wherein the comminution is carried out at a temperature above the melting point of the lubricant.

11. A process according to claim 6, wherein the antiblocking agent is present from 15 to 30% by weight and the lubricant is present from 15 to 30% by weight.

12. A process according to claim 11, wherein the antiblocking agent is present in about 25% by weight and the lubricant is present in about 25% by weight.

13. A process for preparing polyolefin films comprising using as an antiblocking agent and lubricant a combined antiblocking and lubricant concentrate composition comprising
(a) 5–35% by weight of an antiblocking agent selected from the group consisting of diatomaceous earth, precipitated silica, silica gel and mixtures thereof;
(b) 5–30% by weight of a lubricant selected from the group consisting of amides of unsaturated $C_{18}$–$C_{22}$-fatty acids and mixtures thereof; and
(c) polyolefin or a mixture of polyolefin and conventional polyolefin additives, said antiblocking agent is present in finely divided form with a median particle size of up to 10 micrometers and said lubricant has a particle size of less than 100 micrometers and is homogeneously distributed in the total concentrate.

14. A process according to claim 13, wherein the antiblocking agent is present from 15 to 30% by weight and the lubricant is present from 15 to 30% by weight.

15. A process according to claim 14, wherein the antiblocking agent is present in about 25% by weight and the lubricant is present in about 25% by weight.

16. A process according to claim 13 wherein the concentrate is used in a quantity such that the polyolefin film produced contains 0.001 to 0.15% by weight of lubricant and 0.007 to 0.5% by weight of antiblocking agent.

* * * * *